United States Patent Office 3,202,676
Patented Aug. 24, 1965

3,202,676
SUBSTITUTED N-AMINOALKYL 1'-KETO-HEXAMETHYLENE INDOLES
Leonard M. Rice, Minneapolis, Minn., and Meier E. Freed, Philadelphia, and Elisabeth Hertz, Bryn Mawr, Pa., assignors to American Home Products Corporation, New York, N.Y., a corporation of Delaware
No Drawing. Filed Feb. 1, 1963, Ser. No. 255,699
3 Claims. (Cl. 260—319)

The present invention relates in general to a novel series of N-aminoalkyl-1'-keto-hexamethylene indoles and variously substituted derivatives thereof. In its product aspect broadly recited the invention involves the discovery of a novel series of substituted N-aminoalkyl-1'-keto-hexamethylene indoles which may be represented graphically at least in part by the formula:

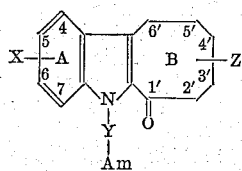

and pharmaceutically acceptable acid addition salts thereof, wherein Y represents a lower alkylene unit preferably a di- or trimethylene unit; Am represents an amino substituent which may be considered to define such groups as a monoalkylamino, a dialkylamino or a pyrrolidino group; and X represents a substituent such as hydrogen, lower alkyl and lower alkoxy which is preferably substituted in the 5-position but which may be substituted in any of the available positions in the A-ring benzenoid moiety or in more than one position. The symbol Z, on the other hand, represents a hydrogen or lower alkyl substituted in ring B in any of the available positions except the 1' position.

In our use of the term "lower alkyl" we intend to refer to those alkyl groups having up to about 8 carbon atoms therein and of course would thus include such groups as methyl, ethyl, propyl, isopropyl, and the like. In a similar manner the term "lower alkoxy" would embrace those lower alkoxy groups such as methoxy, ethoxy, etc., containing a like number of carbon atoms therein.

Of particular interest as a central nervous system moderator one may note the compounds represented by the general structure:

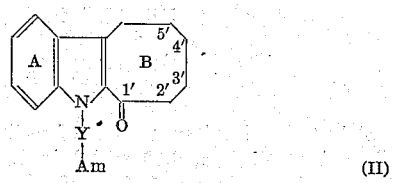

wherein Y stands for a trimethylene unit and Am represents a dialkylamino group so as to give rise to the functional group (3-dialkylaminopropyl) when taken together and attached to the nitrogen atom in the indole nucleus. As a specific member of this general group the compound 1 - (3-dimethylaminopropyl)-1'-keto-2,3-hexamethyleneindole may be particularly mentioned as an antidepresent when administered orally at a dose level of 100–400 mg./kg. of body weight per day to animals.

The preparation of the compounds of the invention generally represented by structures (I) and (II) above may be considered in one process aspect of our invention. In this regard then, formation of said compounds may be generally outlined in the following schematic reaction sequence:

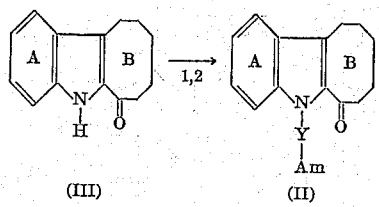

[1=alkali metal hydride (sodium hydride)]
[2=dimethylaminopropyl chloride]

In the above reaction the 1'-keto-2,3-hexamethyleneindole starting material, although not shown as substituted in the A and B rings, may of course be selected from those known compounds or prepared as described hereinbelow. When this is the case the final products will of course be substituted with groups other than hydrogen as defined for X and Z above. In the reaction illustrated generally above the 1'-keto-2,3-hexamethyleneindole starting material in solution with a solvent such as dimethyl formamide will be added first to sodium hydride, and to this mixture is then added 3-dimethylaminopropyl chloride for purposes of illustration; but conceptually and practically speaking, the latter additive may be any agent suitable for alkylating the nitrogen atom in the 1-position of the nucleus of the 1'-keto-2,3-hexamethyleneindole starting material by treatment with such agents as aminoalkyl halides, or any suitable alkylating agent. The reagents are added stepwise in the order indicated at a temperature less than 50° C. in any case, and particularly in the embodiment considered at about 30–40° C. for about 1 hour after adding the alkali metal hydride and at about 50° C. for about 2 to 6 hours after adding the dimethylaminopropyl chloride. The remaining details of the reaction will become obvious from a consideration of the details presented in the several examples provided.

The final compounds of the invention may also be prepared by alkylating the 1'-keto-2,3-hexamethyleneindole starting material with a dialkylaminoalkyl bromide or other halide rather than the chloride noted above. Alternatively, a dihalide such as a dichloride or dibromide may be employed, and the resulting product obtained by treatment with any suitable amine. In a still further variation, other metalating agents than sodium hydride may be employed, such as other alkali metal hydrides, amides, hydroxides, and alkoxides, which may be used if desired within the broad concept of our process.

Likewise, other solvents than dimethyl formamide, such as the organic solvents benzene, toluene, xylene, and hexane, may be employed to give the final products of our invention. The selection of a proper solvent will depend in large measure upon the particular reactants involved and other factors in the reaction. Our preferred solvent, of course, is dimethyl formamide because of its compatibility and ability to labilize the halogen and enable us to carry out reaction at a lower temperature.

Moreover, one may prepare the novel compounds of our invention by a sequence of reactions which involve first treating a known cyclooctanone with a reagent such as sodium ethoxide and ethyl formate to obtain the hydroxymethylene analog 2-hydroxymethylene cyclooctanone. This latter compound is then treated with phenyldiazonium hydroxide to condense and form the intermediate cyclooctane-1,2-dione monophenylhydrazone which when treated with a suitable acid will cyclize to form the 1'-keto-2,3-hexamethyleneindole. As shown above this 1'- keto-2,3-hexamethyleneindole will, when alkylated in the manner above indicated, yield the final active ingredient of the invention. This sequence of reactions may be illustrated, to wit:

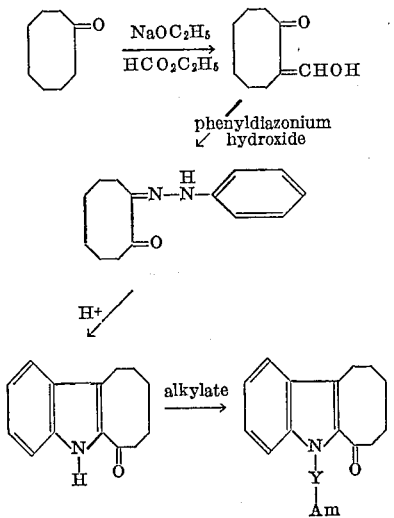

In the above reaction scheme the symbols Y and Am have the respective meanings set forth above.

As regards the acid addition salts of our novel substituted N-aminoalkyl-1'-keto-hexamethylene indoles, it is to be understood that any acid may be used which will produce pharmacologically acceptable salts, for example, such salts of mineral acids as hydrochloride, nitrates, and the like, or alternatively those of mono-, di-, and polycarboxylic organic acids such as acetic, maleic, malonic, succinic, fumaric, and the like, to name a few of such which are found useful in the administration of the bases of the invention in various therapeutic applications. They are prepared by reaction of an equivalent quantity of the free base with the desired acid to effect addition of the acid moiety to the amino group.

In addition, our invention in a further process aspect involves the preparation of certain novel intermediates which serve as starting materials for the preparation of the variously substituted N-aminoalkyl-1'-keto-2,3-hexamethylene indoles of the invention. These starting materials may be generally represented by the formula:

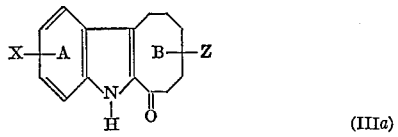

where X and Z have the values set forth above and may be prepared by the method described generally by Witkop et al., J.A.C.S., 73, 2641 (1951), in the following reaction sequence:

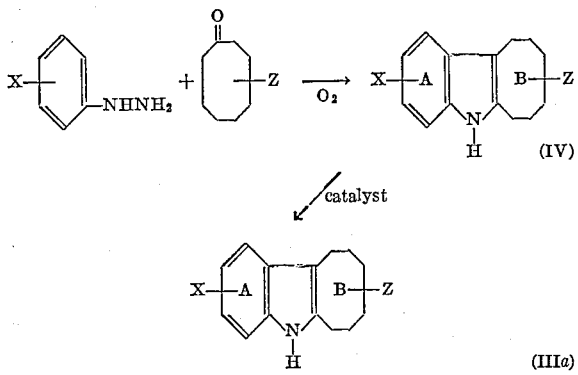

In the above reaction, a known suitably X-substituted phenylhydrazine may be reacted with a known Z substituted cyclic ketone to obtain the indole IV above which may have either or both X and Z substitutions. By oxidation of IV with any siutable oxidizing agent, preferably in the presence of a catalyst such as platinum or the like, the starting material IIIa may be obtained. Alternatively a suitably substituted aniline can be diazotized and coupled with a hydroxymethylene ketone, which may be substituted, and this product is then cyclized to yield a 1'-ketoindole substituted in both A and B rings.

The novel compounds of the present invention each possess utility in that they are either pharmaceutically active central nervous system agents in mammals, possessing antidepressant activity, anticonvulsant acttivity, and the like, in addition to being non-toxic in performing these functions, or are otherwise useful in that they are intermediates from which the pharmaceutically active therapeutic agents may be prepared. In regard to their antidepressant activity they would be expected to potentiate appetite depressants, particularly phenethylamines of various types, such as amphetamine.

The novel compounds of the invention when contemplated for use in pharmaceutical formulations may be admixed if desired with a large number of compatible diluents, carriers, and the like to form a pharmaceutical composition. Oral administration is preferred for rapid onset of effect, and in this regard, solid excipients, binders, extenders, or carriers such as carboxymethylcellulose, starches, sugars, and the like may be employed where tablets or powders are to be employed. Such liquid carriers as mineral oil or a pharmaceutically acceptable lower aliphatic alcohol may be used where injectables for parenteral administration are to be prepared. Glycerine or the like may be used where a syrup is to be used to administer this compound. The dosage range may extend from 0.5 mg. to about 400 mg. per kilogram of body weight per day, although this will vary with the complexities of the particular case.

The following examples further illustrate several of the products and process aspects of our general concept of invention. They further provide several concrete embodiments of both of these aspects in the way of experimental detail sufficient to enable one skilled in the art to practice the general teaching of our discovery. Unless otherwise indicated, the quantities of reagents are in grams and the temperature in degrees centigrade.

It is to be understood that these several illustrative embodiments may not be construed to be more than illustrative of experimental detail, and in this respect do not limit in any manner the legal scope of our inventive concept. For a proper legal definition of such scope, attention is directed to the several appended claims.

EXAMPLE 1

*1-(3-dimethylaminopropyl)-1'-keto-2,3-hexamethyleneindole*

Add to a stirred suspension of sodium hydride, 48% dispersion, (1.65 g., 0.03 mole) in 10 ml. of dimethylformamide, a solution of 1'-keto-2,3-hexamethyleneindole (5.3 g., 0.025 mole) in a 60 ml. of the same solvent. Stir the mixture for one hour at 30–35° C. After cooling to room temperature, add 3-dimethylaminopropyl chloride (3.2 g., 0.025 mole). Heat to 50° for two hours and stir without heating for four hours. Pour this reaction mixture into 300 ml. of cold water and acidify with 10 ml. of concentrated hydrochloric acid. Remove acid-insoluble material by extraction with ether. Render the aqueous layer alkaline with 40% sodium hydroxide. Extract the oil into ether and wash the ether extract with saline, dry over sodium sulfate, and concentrate under vacuum. Take up the residual oil (6.24 g.) in acetone (200 ml.), add a solution of fumaric acid (2.43 g.) in acetone, concentrate, and cool. A yellow gum forms which is separable by decantation and recrystallizable from ethyl-acetate-methanol, and which has M.P. 162–164°.

*Analysis.*—Calcd. for $C_{23}H_{20}N_2O_5$: C, 66.64; H, 7.30; N, 6.76. Found: C, 66.62; H, 7.14; N, 6.91.

EXAMPLE 2

*1-(2-diethylaminoethyl)-1'-keto-2,3-hexamethyleneindole*

Add to a stirred suspension of soduim hydride dispersion (1.65 g., 0.03 mole) in 10 ml. of dimethylformamide, a solution of 1'-keto-2,3-hexamethyleneindole (5.3 g., 0.025 mole) in 60 ml. of the same solvent. Stir the mixture for one hour at 30–35° C. After cooling to room temperature, add diethylaminoethyl chloride (3.04 g., 0.025 mole). Heat to 50° C. for two hours and stir without heating for four hours. Pour this reaction mixture into 300 ml. of cold water and acidify with 10 ml. of concentrated hydrochloric acid. Remove acid insoluble material by extraction with ether. Render the aqueous layer alkaline with 40% sodium hydroxide. Extract the oil into ether and wash the ether extract with saline, dry over sodium sulfate and concentrate under vacuum. Take up the residual oil in acetone and add fumaric acid in acetone, concentrate, and cool to obtain the product of this example.

EXAMPLE 3

*1-(2-pyrrolidinoethyl)-1'-keto-3,3-hexamethylenindole*

Add to a stirred suspension of sodium hydride dispersion (1.65 g., 0.03 mole) in 10 ml. of dimethylformamide, a solution of 1'-keto-2,3,-hexamethyleneindole (5.3 g., 0.025 mole) in 60 ml. of the same solvent. Stir the mixture for one hour at 30–35° C. After cooling to room temperature, add pyrrolidinoethyl chloride (3.0 g., 0.025 mole). Heat to 50° for two hours and stirr without heating for four hours. Pour this reaction mixture into 300 ml. of cold water and acidify with 10 ml. of concentrated hydrochloric acid. Remove acid-insoluble material by extraction with ether. Render the aqueous layer alkaline with 40% sodium hydroxide. Extract the oil into ether and wash the ether extract with saline, dry over sodium sulfate, and concentrate under vacuum. Take up the residual oil in acetone and add fumaric acid in acetone, concentrate, and cool to obtain the product of this example.

EXAMPLE 4

*1-(3-dimethylaminopropyl)-1'-keto-5-methyl-2,3-hexamethyleneindole*

Add to a stirred suspension of sodium hydride dispersion (1.65 g., 0.03 mole) in 10 ml. of dimethylformamide, a solution of 1'-keto-5-methyl-2,3-hexamethyleneindole (0.025 mole) in 60 ml. of the same solvent. Stir the mixture for one hour at 30–35° C. After cooling to room temperature, add 3-dimethylaminopropyl chloride (0.025 mole). Heat to 50° for two hours and stir without heating for four hours. Pour this reaction mixture into 300 ml. of cold water and acidify with 10 ml. of concentrated hydrochloric acid. Remove acid-insoluble material by extraction with ether. Render the aqueous layer alkaline with 40% sodium hydroxide. Extract the oil into ether and wash the ether extract with saline, dry over sodium sulfate, and concentrate under vacuum. Take up the residual oil in acetone and add fumaric acid in acetone, concentrate, and cool to obtain the product of this example.

EXAMPLE 5

*1-(3-dimethylaminopropyl)-1'-keto-2'-methyl-5-methoxy-2,3-hexamethyleneindole*

Add to a stirred suspension of sodium hydride dispersion (1.65 g., 0.03 mole) in 10 ml. of dimethylformamide, a solution of 1'-keto-2'-methyl-5-methoxy-2,3-hexamethyleneindole (0.025 mole) in 60 ml. of the same solvent. Stir the mixture for one hour at 30–35°. After cooling to room temperature add 3-dimethylaminopropyl chloride (0.025 mole). Heat to 50° for two hours and stir without heating for four hours. Pour this reaction mixture into 300 ml. of cold water and acidify with 10 ml. of concentrated hydrochloric acid. Remove acid-insoluble material by extraction with ether. Render the aqueous layer alkaline with 40% sodium hydroxide. Extract the oil into ether and wash the ether extract with saline, dry over sodium sulfate, and concentrate under vacuum. Take up the residual oil in acetone and add fumaric acid in acetone, concentrate, and cool to obtain the product of this example.

EXAMPLE 6

*1-(3-methylaminopropyl)-1'-keto-2'-methyl-5-methyl-2,3-hexamethyleneindole*

Add to a stirred suspension of sodium hydride dispersion (1.65 g., 0.03 mole) in 10 ml. of dimethylformamide, a solution of 1'-keto-2'-methyl-5-methyl-2,3-hexamethyleneindole (0.025 mole) in 60 ml. of the same solvent. Stir the mixture for one hour at 30–35°. After cooling to room temperature, add 3-methylaminopropyl chloride (0.025 mole). Heat to 50° for two hours and stir without heating for four hours. Pour this reaction mixture into 300 ml. of cold water and acidify with 10 ml. of concentrated hydrochloric acid. Remove acid-insoluble material by extraction with ether. Render the aqueous layer alkaline with 40% sodium hydroxide. Extract the oil into ether and wash the ether extract with saline, dry over sodium sulfate, and concentrate under vacuum. Take up the residual oil in acetone and add fumaric acid in acetone, concentrate, and cool to obtain the product of this example.

EXAMPLE 7

*1-(3-dimethylaminopropyl)-1'-keto-2'-ethyl-5-chloro-2,3-hexamethyleneindole*

Add to a stirred suspension of sodium hydride dispersion (1.65 g., 0.03 mole) in 10 ml. of dimethylformamide, a solution of 1'-keto-2'-ethyl-5-chloro-2,3-hexamethyleneindole (0.025 mole) in 60 ml. of the same solvent. Stir the mixture for one hour at 30–35°. After cooling to room temperature add 3-dimethylaminopropyl chloride (0.025 mole). Heat to 50° for two hours and stir without heating for four hours. Pour this reaction mixture into 300 ml. of cold water and acidify with 10 ml. of concentrated hydrochloric acid. Remove acid-insoluble material by extraction with ether. Render the aqueous layer alkaline with 40% sodium hydroxide. Extract the oil into ether and wash the ether extract with saline, dry over sodium sulfate, and concentrate under vacuum. Take up the residual oil in acetone and add fumaric acid in acetone, concentrate, and cool to obtain the product of this example.

We claim:
1. A compound of the group consisting of an N-amino(lower)alkyl-1¹-keto-hexamethyleneindole of the formula:

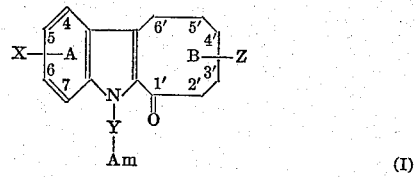

and the pharmaceutically acceptable acid addition salts thereof; wherein X is a member selected from the group consisting of hydrogen, lower alkyl and lower alkoxy, Y is lower alkylene, Z is a member selected from the group consisting of hydrogen and lower alkyl, and Am is a member selected from the group consisting of amino, mono(lower)alkylamino, di(lower)alkylamino and pyrrolidino.

2. A compound according to claim 1 wherein Y is trimethylene and Am is di-(lower)alkylamino.

3. 1-(3 - dimethylaminopropyl) - 1'-keto-2,3-hexamethyleneindole.

References Cited by the Examiner
UNITED STATES PATENTS
2,979,502  4/61  Gailliot et al. _____ 260—247.5

OTHER REFERENCES
Witkop et al.: Jour. Amer. Chem. Soc., vol. 73, 1951, pages 2641–2647.

NICHOLAS S. RIZZO, *Primary Examiner.*
WALTER A. MODANCE, *Examiner.*